United States Patent
Kim (10) Patent No.: US 11,809,313 B2
(45) Date of Patent: Nov. 7, 2023

(54) RESOURCE CACHING METHOD AND ELECTRONIC DEVICE SUPPORTING THE SAME

(71) Applicant: Samsung Electronics Co., Ltd., Gyeonggi-do (KR)

(72) Inventor: Joohyun Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 412 days.

(21) Appl. No.: 17/252,362

(22) PCT Filed: May 29, 2019

(86) PCT No.: PCT/KR2019/006421
§ 371 (c)(1),
(2) Date: Dec. 15, 2020

(87) PCT Pub. No.: WO2019/240404
PCT Pub. Date: Dec. 19, 2019

(65) Prior Publication Data
US 2021/0365366 A1    Nov. 25, 2021

(30) Foreign Application Priority Data
Jun. 15, 2018  (KR) .......................... 10-2018-0069214

(51) Int. Cl.
*G06F 12/02*  (2006.01)
*G06F 16/955*  (2019.01)
(Continued)

(52) U.S. Cl.
CPC ........ *G06F 12/0253* (2013.01); *G06F 9/4881* (2013.01); *G06F 9/5016* (2013.01); *G06F 12/0815* (2013.01); *G06F 16/955* (2019.01)

(58) Field of Classification Search
CPC ............. G06F 12/0253; G06F 12/0815; G06F 16/955; G06F 9/5016
See application file for complete search history.

(56) References Cited

U.S. PATENT DOCUMENTS 8,060,697 B1 *  11/2011  Kneisley ............. G06F 16/9574
                                                            707/726
9,037,662 B2     5/2015  Kaplinger et al.
(Continued)

FOREIGN PATENT DOCUMENTS

KR    10-2010-0031835 A    3/2010
KR    10-2012-0016333 A    2/2012
(Continued)

OTHER PUBLICATIONS

Korean Office Action dated May 19, 2023.

*Primary Examiner* — Huawen A Peng
(74) *Attorney, Agent, or Firm* — Cha & Reiter, LLC (57) ABSTRACT

An electronic device is disclosed that includes a display, a communication circuitry, a first memory storing a native web application including a first resource, a second memory loaded with instructions included in the native web application, and a processor operatively connected with the display, the communication circuitry, the first memory, and the second memory. The processor is configured to transmit a request to identify whether the first resource is changed to an external electronic device, via the communication circuitry, when a specified condition is met, use the first resource in response to receiving a response that the first resource is not changed from the external electronic device or not responding to a connection to the external electronic device, receive a second resource replacing the first resource from the external electronic device, via the communication circuitry, in response to receiving a response that the first resource is changed from the external electronic device, and (Continued)

use the second resource. In addition, various embodiments recognized through the specification are possible.

13 Claims, 8 Drawing Sheets

(51) Int. Cl.
    *G06F 9/48*     (2006.01)
    *G06F 9/50*     (2006.01)
    *G06F 12/0815*     (2016.01)

(56) References Cited

U.S. PATENT DOCUMENTS

| | | | |
|---|---|---|---|
| 9,043,469 B2 | 5/2015 | Kaplinger et al. | |
| 9,305,107 B2 | 4/2016 | Siliski et al. | |
| 9,325,633 B2 | 4/2016 | Kaplinger et al. | |
| 9,331,957 B2 | 5/2016 | Kaplinger et al. | |
| 9,436,572 B2 * | 9/2016 | Choi | G06F 12/0815 |
| 9,596,312 B2 | 3/2017 | Ahrens | |
| 9,716,770 B2 | 7/2017 | Kaplinger et al. | |
| 9,716,771 B2 | 7/2017 | Kaplinger et al. | |
| 9,813,521 B2 | 11/2017 | Siliski et al. | |
| 10,067,790 B2 * | 9/2018 | Wu | G06F 9/50 |
| 2010/0235329 A1 * | 9/2010 | Koren | H04W 4/50 707/687 |
| 2012/0317363 A1 * | 12/2012 | Uola | G06F 12/0806 711/130 |
| 2014/0215019 A1 | 7/2014 | Ahrens | |
| 2015/0248347 A1 * | 9/2015 | Minematsu | G06F 16/9574 711/159 |
| 2015/0281869 A1 | 10/2015 | Ramachandran et al. | |
| 2016/0019210 A1 * | 1/2016 | O'Brian | G06F 16/955 707/800 |
| 2016/0219122 A1 | 7/2016 | Siliski et al. | |
| 2016/0226994 A1 | 8/2016 | Kaplinger et al. | |
| 2019/0251025 A1 * | 8/2019 | Liu | G06F 8/62 |
| 2019/0317969 A1 * | 10/2019 | Chumbley | G06F 16/955 |
| 2021/0012911 A1 * | 1/2021 | Wang | G16Y 40/30 |

FOREIGN PATENT DOCUMENTS

| | | | |
|---|---|---|---|
| KR | 10-2013-0029926 A | 3/2013 | |
| KR | 10-2014-0124192 A | 10/2014 | |
| KR | 10-2015-0118843 A | 10/2015 | |
| KR | 10-2015-0131818 A | 11/2015 | |
| KR | 10-1589870 B1 | 2/2016 | |
| KR | 101589870 * | 2/2016 | G06F 12/02 |
| KR | 10-2016-0127798 A | 11/2016 | |

* cited by examiner

| RESOURCE ID 510 | URL 520 | TYPE 530 | CREATED DATE 540 | CACHED DATE 550 | LAST DATE OF USE 560 | NUMBER OF USES 570 | PRIORITY 580 | CACHED OR NOT 590 |
|---|---|---|---|---|---|---|---|---|
| 1 | /style.a.css | CSS | 2017-01-23 | 2017-01-24 | 2017-02-02 | 21 | 92 | o |
| 2 | /script.b.js | Java Script | 2017-01-23 | 2017-01-24 | 2017-02-02 | 20 | 88 | o |
| 3 | /c.jpg | Image | 2017-01-23 | 2017-01-24 | 2017-02-01 | 11 | 43 | o |
| 4 | /d.jpg | Image | 2017-01-23 | 2017-01-25 | 2017-02-02 | 9 | 33 | x |
| ... | ... | ... | ... | ... | ... | ... | ... | ... |

RESOURCE CACHING METHOD AND ELECTRONIC DEVICE SUPPORTING THE SAME

CROSS REFERENCE TO RELATED APPLICATIONS

This application is a National Phase Entry of PCT International Application No. PCT/KR2019/006421, which was filed on May 29, 2019, and claims a priority to Korean Patent Application No. 10-2018-0069214, which was filed on Jun. 15, 2018, the contents of which are incorporated herein by reference.

TECHNICAL FIELD

Embodiments disclosed in the disclosure relate to a resource caching technology.

BACKGROUND ART

Recently, with the rapid development of the communication technology of networks including the Internet, a web service of providing multimedia content such as texts and images has been developed in various forms. A user who wants to receive the web service may access a web server over the Internet using a web browser, and the web server may provide a web page written using a web language such as a hypertext markup language (HTML).

DISCLOSURE

Technical Problem

A web browser may output a web page provided by a web server on a screen, but there may occur various problems in a process of customizing the web page and a resource associated with the web page to suit a characteristic of an electronic device or a request of a user.

Embodiments disclosed in the disclosure may provide an electronic device including a native web application for customizing a resource associated with a web page and providing a user with the customized resource.

Furthermore, embodiments disclosed in the disclosure may provide a resource caching method for caching a resource associated with a web page and allowing a native web application to use the cached resource and an electronic device supporting the same.

Technical Solution

In accordance with an aspect of the disclosure, an electronic device is provided. The electronic device may include a communication circuitry, a memory, and a processor. The processor may be configured to receive a request to run a specific application stored in the memory, first run the application depending on the request, and then update a resource necessary for operation of the application through background processing.

Alternatively, the processor may be configured to, when access to a resource which is not cached according to the running of the application is requested, access an external electronic device (or an external server device) which provides the resource which is not cached, download and cache the resource from the external electronic device, and transmit the cached resource to the application.

In accordance with another aspect of the disclosure, an electronic device is provided. The electronic device may include a display, a communication circuitry, a first memory storing a native web application including a first resource, a second memory loaded with instructions included in the native web application, and a processor operatively connected with the display, the communication circuitry, the first memory, and the second memory. The processor may be configured to transmit a request to identify whether the first resource is changed to an external electronic device, via the communication circuitry, when a specified condition is met, use the first resource in response to receiving a response that the first resource is not changed from the external electronic device or that the external electronic device does not respond to a connection to the request, receive a second resource replacing the first resource from the external electronic device, via the communication circuitry, in response to receiving a response that the first resource is changed from the external electronic device, and use the second resource.

Furthermore, in accordance with another aspect of the disclosure, a method for caching a resource in an electronic device is provided. The method may include transmitting, by a processor of the electronic device. a request to identify whether a first resource included in a native web application stored in a first memory is changed to an external electronic device, via a communication circuitry, when a specified condition is met, using the first resource in response to receiving a response that the first resource is not changed from the external electronic device or that the external electronic device does not respond to a connection, and receiving a second resource replacing the first resource from the external electronic device, via the communication circuitry, in response to receiving a response that the first resource is changed from the external electronic device, and using the second resource.

Advantageous Effects

According to embodiments disclosed in the disclosure, multimedia content provided by a web server may be customized and provided to suit a characteristic of an electronic device or a request of a user.

Furthermore, according to embodiments disclosed in the disclosure, as the native web application uses the cached resource, a user experience environment similar to a native application may be provided.

Furthermore, according to technologies disclosed in the disclosure, a resource associated with a function frequently used by the user may be cached to efficiently use a system resource.

In addition, various effects ascertained directly or indirectly through the disclosure may be provided.

With regard to description of drawings, the same or similar denotations may be used for the same or similar components.

MODE FOR INVENTION

Figure 1:
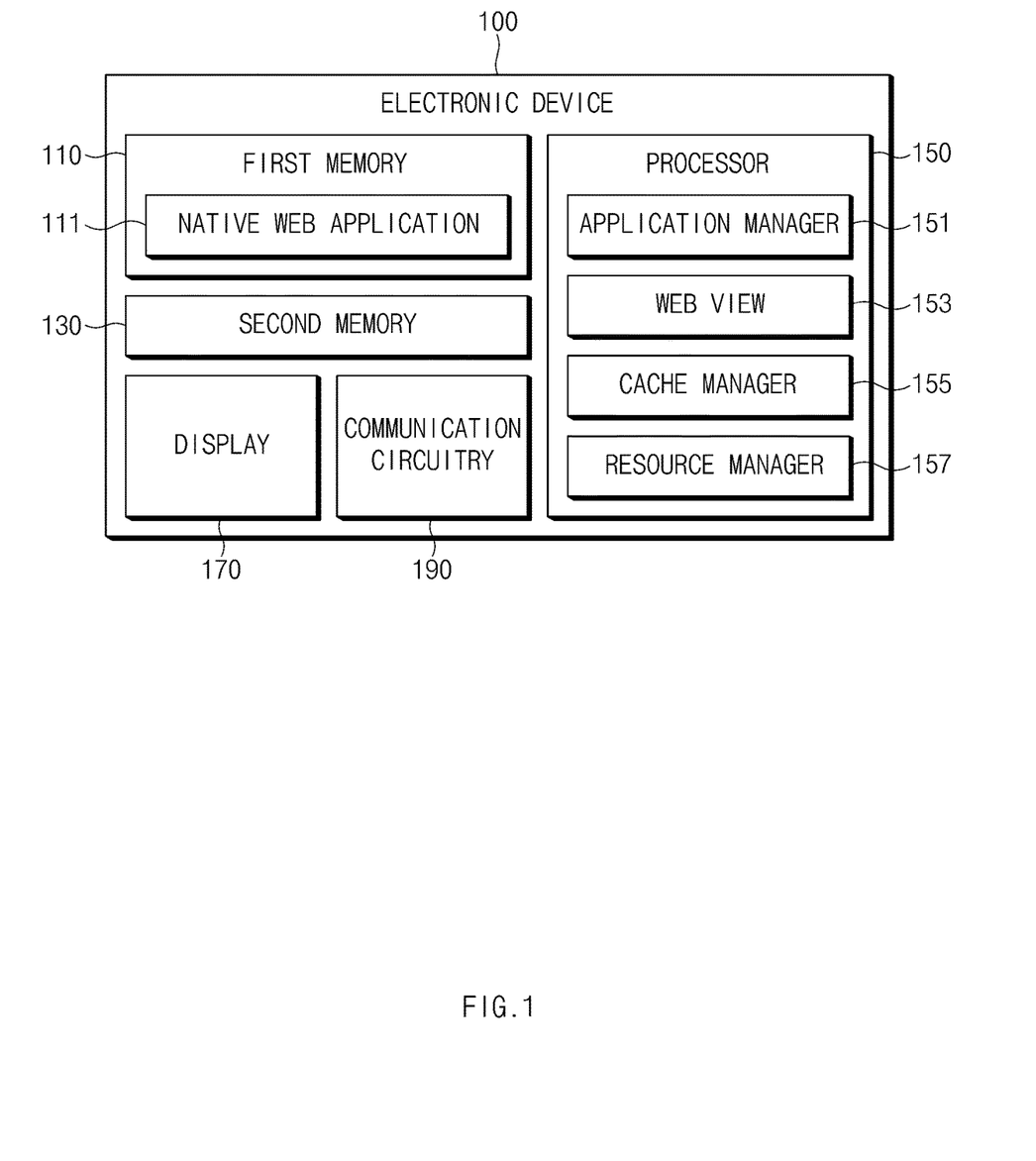
FIG. 1 is a block diagram of an electronic device according to an embodiment.

FIG. 1 is a block diagram of an electronic device according to an embodiment.

According to an embodiment, an electronic device 100 may customize multimedia content provided by a web server (or an external electronic device) to suit a characteristic of the electronic device 100 or a request of a user. For example, the electronic device 100 may receive a resource associated with a web page provided by the web server from the web server and may arrange (or output or display) a web page corresponding to the resource in a screen where an application is running, as it is (without change) or with change in the received resource. In other words, the electronic device 100 may provide a web page in the form of being embedded in the application. Herein, the application in which the web page is embedded may referred to as a native web application.

Because it is possible for the native web application to include the web page and directly access an internal component of an electronic device 100 (e.g., an input device, an output device, a camera, a sensor, a communication circuitry, or the like of the electronic device 100), the native web application may provide a user with various types of user interfaces. For example, the native web application may differently define a function of processing a touch input generated on a web page screen in an existing web page and may provide a separate function together with a web page output function.

Furthermore, the electronic device 100 may caches a resource to be used by the native web application under a specified condition. In this case, the native web application may configure a web page screen using the cached resource without a process of connecting to a web server. Thus, the electronic device 100 may provide the native web application in a user experience (UX) environment similar to a native application. For example, the electronic device 100 may enhance a running speed of the native web application to the level of the native application.

Referring to FIG. 1, the electronic device 100 for performing the above-mentioned function may include a first memory 110, a second memory 130, a processor 150, a display 170, and a communication circuitry 190. However, the configuration of the electronic device 100 is not limited thereto. According to various embodiments, the electronic device 100 may further include at least one component other than the above-mentioned components.

The first memory 110 may store various data used by at least one component (e.g., the processor 150) of the electronic device 100, for example, an application (e.g., a native web application 111) and input data or output data for a command associated with it. According to an embodiment, at least a part of the first memory 110 may include a non-volatile memory.

The native web application 111 may be a kind of a native application installed in the electronic device 100, which may provide a web function. For example, the native web application 111 may configure a web page provided by the web server on an execution screen as it is or as processed. According to an embodiment, the native web application 111 may be installed in the first memory 110 in the form of a package including a resource associated with a web page.

The second memory 130 may store a command or data received from at least one component (e.g., the processor 150) of the electronic device 100. For example, in a process where the native web application 111 stored in the first memory 110 is running, the second memory 130 may store a command or data (or a resource) included in the native web application 111. In other words, the command or the data (or the resource) included in the native web application 111 may be loaded into the second memory 130. According to an embodiment, at least a part of the second memory 130 may include a volatile memory.

The processor 150 may control at least one other component (e.g., a hardware or software component) of the electronic device 100 and may perform a variety of data processing and calculation. The processor 150 may load a command or data received from another component (e.g., the communication circuitry 190) into the second memory 130 to process the command or data and may store result data in the first memory 110. For example, the processor 150 may load the command or the data (or the resource) included in the native web application 111 installed in the first memory 110 into the second memory 130 to process the command or the data (or the resource).

The processor 150 may include an application manager 151, a web view 153, a cache manager 155, and a resource manager 157. The application manager 151 may manage a life cycle of an application (e.g., the native web application 111) installed in the first memory 110. For example, the application manager 151 may process installation, update, deletion, or the like of an application. According to an embodiment, the application manager 151 may copy and store (or cache) a resource included in the native web application 111 into a specified region (e.g., a cache area) of the first memory 110. For example, the application manager 151 may receive a resource associated with a web page included in the native web application 111 installed in the form of the package from the web server and may store the resource in the first memory 110 in advance. According to various embodiments, at least a part of the application manager 151 may be implemented as at least one software module or at least one hardware module (e.g., at least one processor). When the application manager 151 is implemented as the at least one software module, it may be uploaded to a memory (e.g., the second memory 130) to perform an operation set by the at least one processor.

The web view 153 may configure a UI screen of the native web application 111. According to an embodiment, the web view 153 may configure a web page screen using the resource cached in the first memory 110. The web view 153 may configure a web page screen using an image resource or the like associated with html defining a structure of a document object model (DOM), cascading style sheets (css) defining a displayed shape of each object, or javascript taking charge of an operation part. According to various embodiments, at least a part of the web view 153 may be implemented as at least one software module (e.g., including instructions which are uploaded to the memory and perform an operation specified by at least one processor) or at least one hardware module (e.g., the at least one processor).

The cache manager 155 may manage a specified area (e.g., a cache area) of the first memory 110. For example, the cache manager 155 may process update or deletion of a resource stored in the specified area of the first memory 110. According to an embodiment, the cache manager 155 may manage a resource included in the native web application 110 and a resource cached in the specified area of the first memory 110 using a resource list. For example, the cache manager 155 may record information, such as an identifier (ID) of the resource, a URL of the resource, a type (or format) of the resource, a created date of the resource, a cached date of the resource, a last date of use of the resource, the number of uses of the resource, a priority of the resource, or whether the resource is cached, in the resource list. According to various embodiments, at least a part of the cache manager 155 may be implemented as at least one software module (e.g., including instructions which are uploaded to the memory and perform an operation specified by at least one processor) or at least one hardware module (e.g., the at least one processor).

According to an embodiment, the cache manager 155 may update a resource associated with the web page previously stored in the first memory 110. As an example, the cache manager 155 may access the web server to identify whether the resource is changed, via the communication circuitry 190 depending on a specified condition. When the resource is changed, the cache manager 155 may receive the changed resource from the web server and may update the resource stored in the first memory 110. In other words, the cache manager 155 may update the resource cached in the first memory 110 to the latest version. In this regard, the specified condition may be a condition of connecting to the web server based on setting information. For example, when a connection condition such as a time of access to the web server or the number of times of accessing the web server is set, the cache manager 155 may access the web server depending on the set information to update the cached resource. Thus, the web server does not one-sidedly transmit a resource associated with the web page to the electronic device 100. The electronic device 100 may receive the resource from the web server when necessary, thus overcoming disadvantages such as a delay generated in the process of connecting to the web server.

According to an embodiment, the cache manager 155 may delete the resource cached in the first memory 110. The cache manager 155 may delete the cached resource to ensure a space for the specified area (e.g., the cache area) of the first memory 110. As an example, the cache manager 155 may select a target to be deleted in an order of resources with low priorities, in priorities set on the basis of the number of uses of the cached resource, a last date of use of the cached resource, or the like. The cache manager 155 may select a target to be deleted, until a space for the specified area of the first memory 110 meets a specified level (or size). Furthermore, when a resource which is not recorded in the resource list is cached in the specified area of the first memory 110, the cache manager 155 may select the corresponding resource as the target to be deleted. Thereafter, the cache manager 155 may delete resource information selected as the target to be deleted from the resource list and may also delete the resource information from the specified area of the first memory 110.

The resource manager 157 may manage a resource included in an application (e.g., the native web application 111). According to various embodiments, at least a part of the resource manager 157 may be implemented as at least one software module (e.g., including instructions which are uploaded to the memory and perform an operation specified by at least one processor) or at least one hardware module (e.g., the at least one processor).

The display 170 may visually provide a user of the electronic device 100 with information. For example, the display 170 may display a variety of content (e.g., a text, an image, a video, an icon, a symbol, or the like) to the user. The display 170 may include a control circuitry. According to an embodiment, the display 170 may include a touch circuitry or a pressure sensor capable of measuring intensity of pressure to a touch.

The communication circuitry 190 may establish a wired or wireless communication channel between the electronic device 100 and an external electronic device (e.g., a web server) and may support to communicate over the established communication channel. For example, the communication circuitry 190 may be connected to a network through wired or wireless communication to communicate with the external electronic device.

As described above, according to various embodiments, an electronic device (e.g., the electronic device 100) may include a display (e.g., the display 170), a communication circuitry (e.g., the communication circuitry 190), a first memory (e.g., the first memory 110) storing a native web application (e.g., the native web application 111) including a first resource, a second memory (e.g., the second memory 130) loaded with instructions included in the native web application, and a processor (e.g., the processor 150) operatively connected with the display, the communication circuitry, the first memory, and the second memory. The processor may be configured to transmit a request to identify whether the first resource is changed to an external electronic device, via the communication circuitry, when a specified condition is met, use the first resource in response to receiving a response that the first resource is not changed from the external electronic device or that the external electronic device does not respond to a connection to the request, receive a second resource replacing the first resource from the external electronic device, via the communication circuitry, in response to receiving a response that the first resource is changed from the external electronic device, and use the second resource.

According to various embodiments, the first memory may include a non-volatile memory and the second memory may include a volatile memory.

According to various embodiments, the specified condition may include at least one of a condition where a time of access to the external electronic device is greater than a specified time and a condition where the number of times of accessing the external electronic device is greater than a specified number of times.

According to various embodiments, the processor may be configured to store information about the first resource or the second resource in the first memory.

According to various embodiments, the information may include at least one of an identifier of the first resource or the second resource, a URL of the first resource or the second resource, a type of the first resource or the second resource, a created date of the first resource or the second resource, a cached date of the first resource or the second resource, a last date of use of the first resource or the second resource, the number of uses of the first resource or the second resource, a priority of the first resource or the second resource, or whether the first resource or the second resource is cached.

According to various embodiments, the processor may be configured to identify an expiration date of the first resource or the second resource stored in the first memory, download the second resource from the second external electronic device, via the communication circuitry, when it is determined that the expiration date elapses, and store the downloaded second resource in the first memory.

According to various embodiments, the processor may be configured to, when a space of the first memory is less than or equal to a specified level (or a specified size), determine whether to delete the first resource or the second resource based on a priority of the first resource or the second resource stored in the first memory and, when the first resource or the second resource is a target to be deleted, delete the first resource or the second resource from the first memory.

According to various embodiments, the processor may be configured to assign the priority based on at least one of the number of uses of the first resource or the second resource and a last date of use of the first resource or the second resource.

According to various embodiments, the processor may be configured to transmit a request to identify whether the first resource is changed to the external electronic device through a thread, store the first resource in the first memory, and receive the second resource and store the second resource in the first memory.

Figure 2:
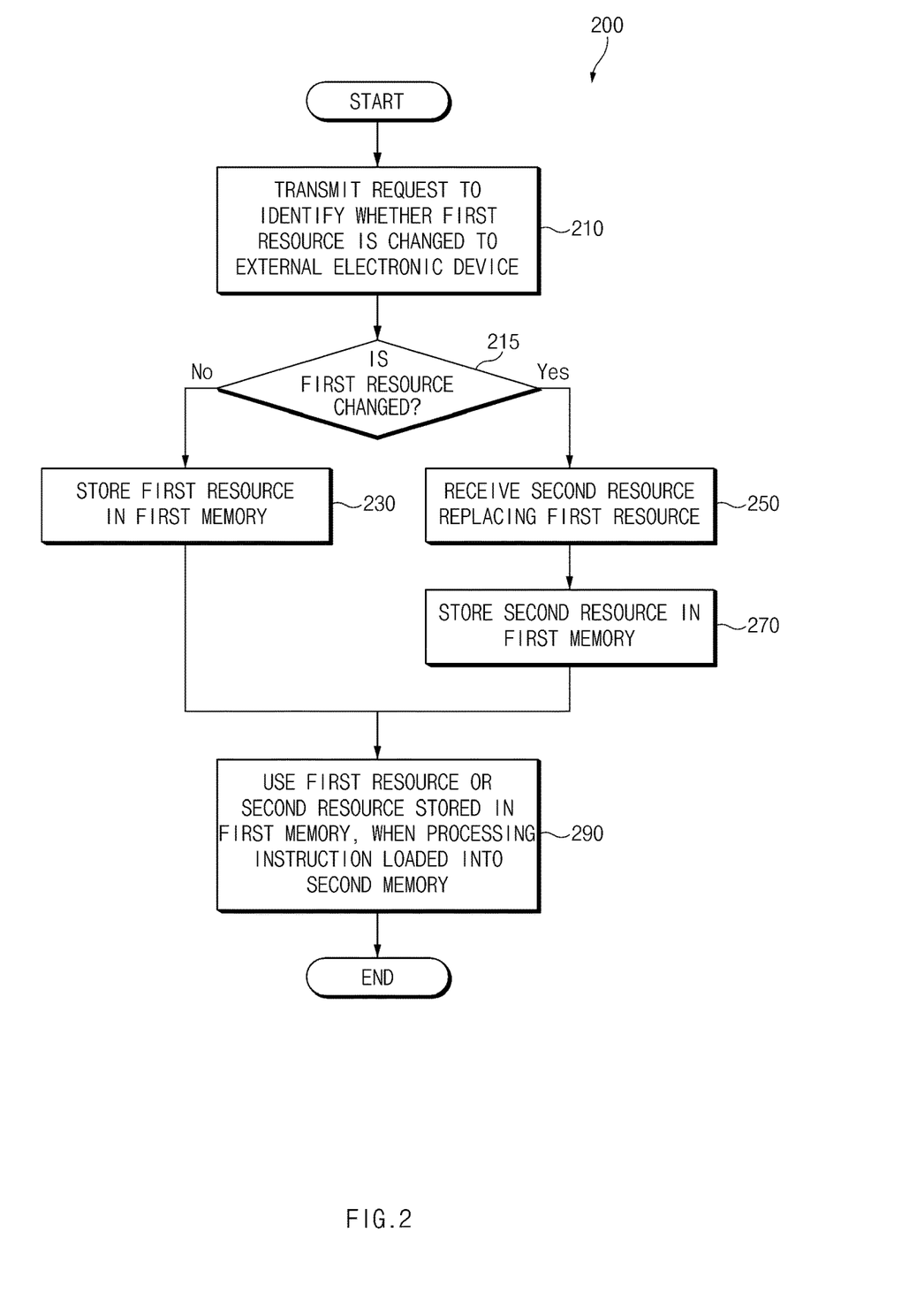
FIG. 2 is a drawing illustrating an operation method of an electronic device associated with caching a resource according to an embodiment.

FIG. 2 is a drawing illustrating an operation method 200 of an electronic device associated with caching a resource according to an embodiment.

Referring to FIG. 2, in conjunction with the operation method 200 of the electronic device associated with caching the resource, in operation 210, a processor (e.g., a processor 150 of FIG. 1) of the electronic device (e.g., an electronic device 100) may transmit a request to identify whether a first resource included in a native web application (e.g., a native web application 111 of FIG. 1) is changed to an external electronic device (e.g., a web server), via communication circuitry (e.g., a communication circuitry 190). For example, the processor may transmit an identification request to the external electronic device to identify whether the first resource has the latest version. According to an embodiment, only when the specified condition is met, the processor may perform operation 210. The specified condition may include, for example, a condition of connection to the external electronic device based on setting information.

In operation 215, the processor 150 may identify whether the first resource is changed. For example, when a condition where a time of access to the external electronic device is greater than a specified time, a condition where the number of times of accessing the external electronic device is greater than a specified number of times, or the like is set, according to the set information, the processor may access the external electronic device to identify whether the first resource is changed.

When receiving a response that the first resource is not changed from the external electronic device in operation 215, in operation 230, the processor may store (or cache) the first resource included in the native web application in a first memory (e.g., a first memory 110 of FIG. 1). For example, the processor may store the first resource included in the native web application in a cache area of the first memory. According to various embodiments, although the connection to the external electronic device is not performed during a specified time or although not receiving the response about whether the first resource is changed during the specified time, in operation 230, the processor may store the first resource in the first memory. Thus, although the connection to the external electronic device is not performed due to a network connection problem, the processor may output a web page screen of the native web application on a display (e.g., a display 170 of FIG. 1).

When receiving a response that the first resource is changed from the external electronic device in operation 215, in operation 250, the processor may receive a second resource replacing the first resource (e.g., the second resource generated as the first resource is changed) from the external electronic device, via the communication circuitry. Furthermore, in operation 270, the processor may store (or cache) the received second resource in the first memory. In other words, the processor may store the latest version of resource (the second resource) in a cache area of the first memory.

Thereafter, in the process of running the native web application, when processing an instruction to use the first resource among instructions included in the native web application loaded into a second memory (e.g., a second memory 130 of FIG. 1), in operation 290, the processor may use the first resource or the second resource stored in the first memory. In other words, the processor may configure a web page screen using a resource (e.g., the first resource or the second resource) stored in the cache area of the first memory and may output the configured web page screen on the display.

Figure 3:
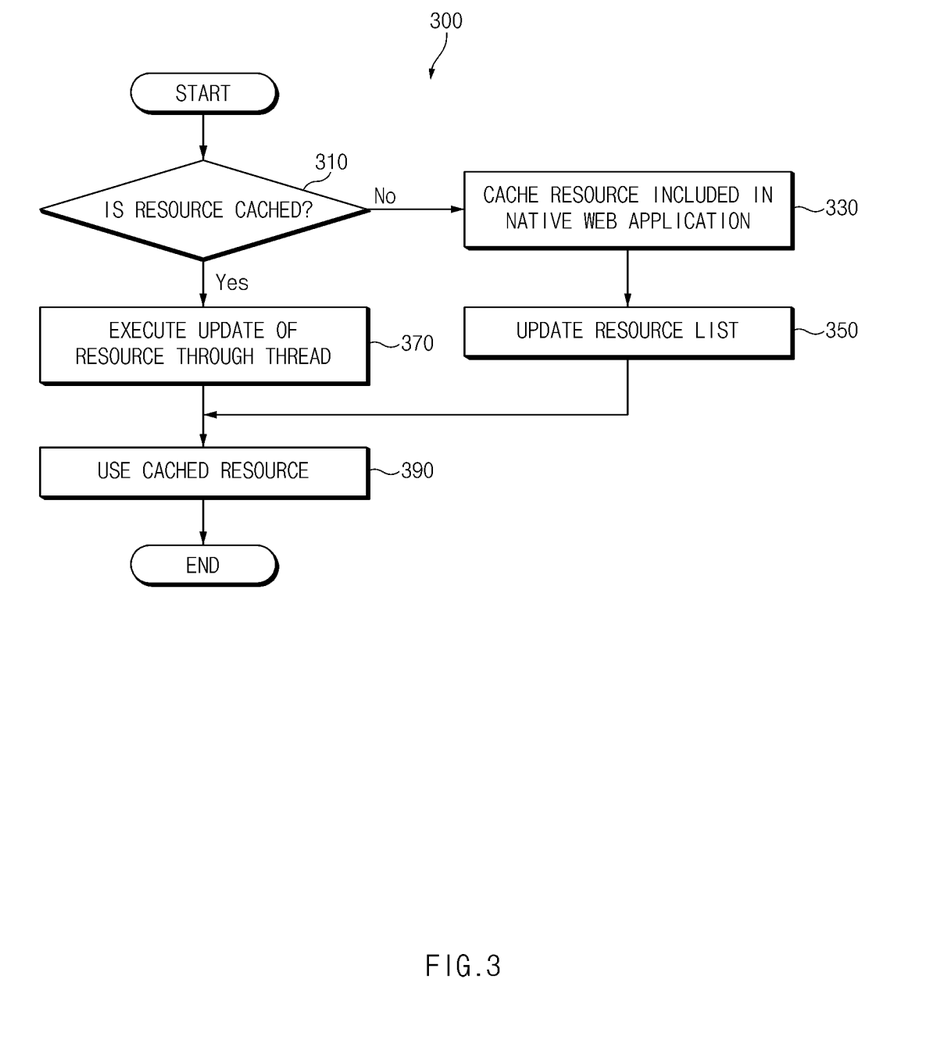
FIG. 3 is a drawing illustrating an operation method of an electronic device associated with using a resource according to an embodiment.

FIG. 3 is a drawing illustrating an operation method 300 of an electronic device associated with using a resource according to an embodiment.

Referring to FIG. 3, in conjunction with the operation method 300 of the electronic device associated with using the resource, in a process of running a native web application (e.g., a native web application 111 of FIG. 1), when receiving a request to process an instruction to use a resource associated with a web page among instructions included in the native web application loaded into a second memory (e.g., a second memory 130 of FIG. 1), in operation 310, a processor (e.g., a processor 150 of FIG. 1) of the electronic device (e.g., an electronic device 100 of FIG. 1) may determine that the resource is cached in a first memory (e.g., a first memory 110 of FIG. 1). For example, the processor may identify whether the resource is stored in a cache area of the first memory (e.g., a non-volatile memory area).

When the resource is not cached in the first memory, in operation 330, the processor may cache a resource included in the native web application in the first memory. For example, the processor may store the resource included in the native web application in the cache area of the first memory. Furthermore, in operation 350, the processor may update a resource list. For example, the processor may record an identifier (ID) of the resource, a URL of the resource, a type (or format) of the resource, a created date of the resource, a cached date of the resource, a last date of use of the resource, the number of uses of the resource, a priority of the resource, whether the resource is cached, or the like, in the resource list.

When the resource is cached in the first memory, in operation 370, the processor may execute an update of the resource through a thread. For example, the processor may proceed with updating the resource, independently of running the native web application (or as the background), using the thread. As an example, the processor may identify whether the resource is changed by means of a web server and may receive the latest version of resource from the web server to update an existing resource stored in the cache area of the first memory, when the resource is changed.

In operation 390, the processor may process an instruction to use a resource associated with a web page, using the resource cached in the first memory. For example, the processor may configure a web page screen using the resource stored in the cache area of the first memory.

According to an embodiment, because the process of updating the resource, which is executed in operation 370, is performed independently of processing the instruction to use the resource associated with the web page (or as the background), a previously cached resource may be used for configuring a web page screen. This may lead to an effect of preventing screen blinking due to a change in resource from being generated, because the resource changed in real time is not reflected in the web page screen. The web page screen using the changed resource may be output when the native web application is run again.

According to various embodiments, an electronic device according to an embodiment may include a display, a communication circuitry, a first memory storing a native web application, a second memory loaded with instructions included in the native web application, and a processor operatively connected with the display, the communication circuitry, the first memory, and the second memory. The processor may be configured to receive a request to run the native web application (e.g., a request according to a user input), run the native web application based on a first resource cached in the first memory, and update the first resource through background processing.

The first memory may include a non-volatile memory.

The processor may be configured to establish a communication channel with a web server device associated with the native web application, receive a second resource associated with operating the native web application from the web server device, and cache the second resource in the first memory.

The processor may update a screen output on the display by applying the second resource cached in the first memory to the native web application at a specified scheduling time. Alternatively, when a screen of the display is changed or when a specified user input occurs, the processor may update a screen output on the display by applying the second resource cached in the first memory to the native web application.

According to various embodiments, an operation method of an electronic device according to an embodiment may receiving a request to run a native web application stored in a non-volatile memory, loading instructions included in the native web application into a volatile memory to run the native web application based on a first resource which is stored in the non-volatile memory is associated with running the native web application, and establishing a communication channel with a web server device through background processing to receive a second resource associated with updating the first resource and store the second resource in the non-volatile memory.

Figure 4:
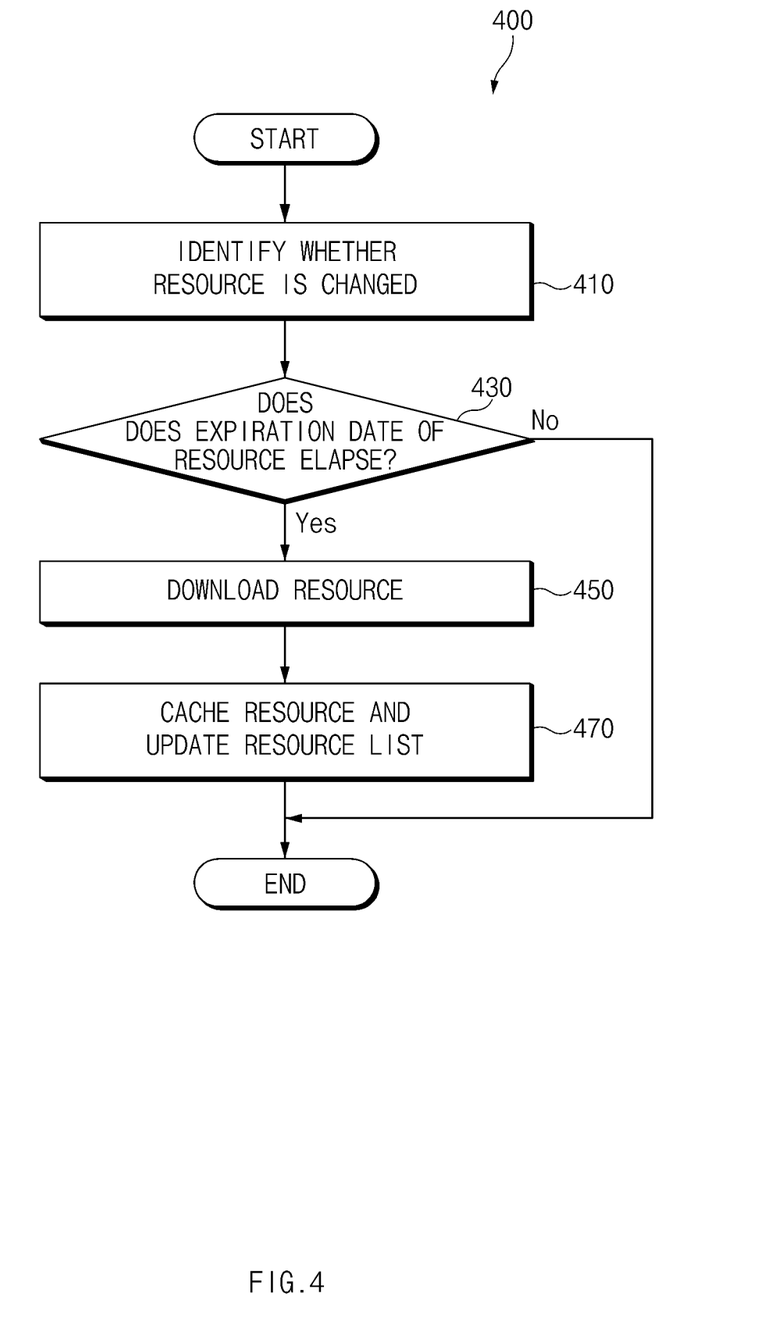
FIG. 4 is a drawing illustrating an operation method of an electronic device associated with updating a resource according to an embodiment.

FIG. 4 is a drawing illustrating an operation method 400 of an electronic device associated with updating a resource according to an embodiment.

Referring to FIG. 4, in conjunction with the operation method 400 of the electronic device associated with updating the resource, a processor (e.g., a processor 150 of FIG. 1) of the electronic device (e.g., an electronic device 100 of FIG. 1) may update a resource cached in a first memory (e.g., a first memory 110 of FIG. 1). In operation 410, the processor may identify whether the resource cached in the first memory is changed. As an example, the processor may transmit a request to identify whether the resource is changed to an external electronic device (e.g., a web server) via communication circuitry (e.g., communication circuitry 190), and the external electronic device may transmit a response to whether the resource is changed to the electronic device.

In operation 430, the processor may determine whether an expiration date of the resource elapses. For example, the processor may identify whether an expiration date of a resource set through tag information or the like defined in an HTTP header according to the HTTP specification elapses.

When the expiration date of the resource elapses, in operation 450, in operation 450, the processor may download the resource from the external expiration date, via the communication circuitry.

Furthermore, in operation 470, the processor may cache the downloaded resource in the first memory and may update information about the resource to a resource list. For example, the processor may store the downloaded resource in a cache area of the first memory and may record an identifier (ID) of the resource, a URL of the resource, a type (or format) of the resource, a created date of the resource, a cached date of the resource, a last date of use of the resource, the number of uses of the resource, a priority of the resource, whether the resource is cached, or the like, in the resource list.

Figure 5:
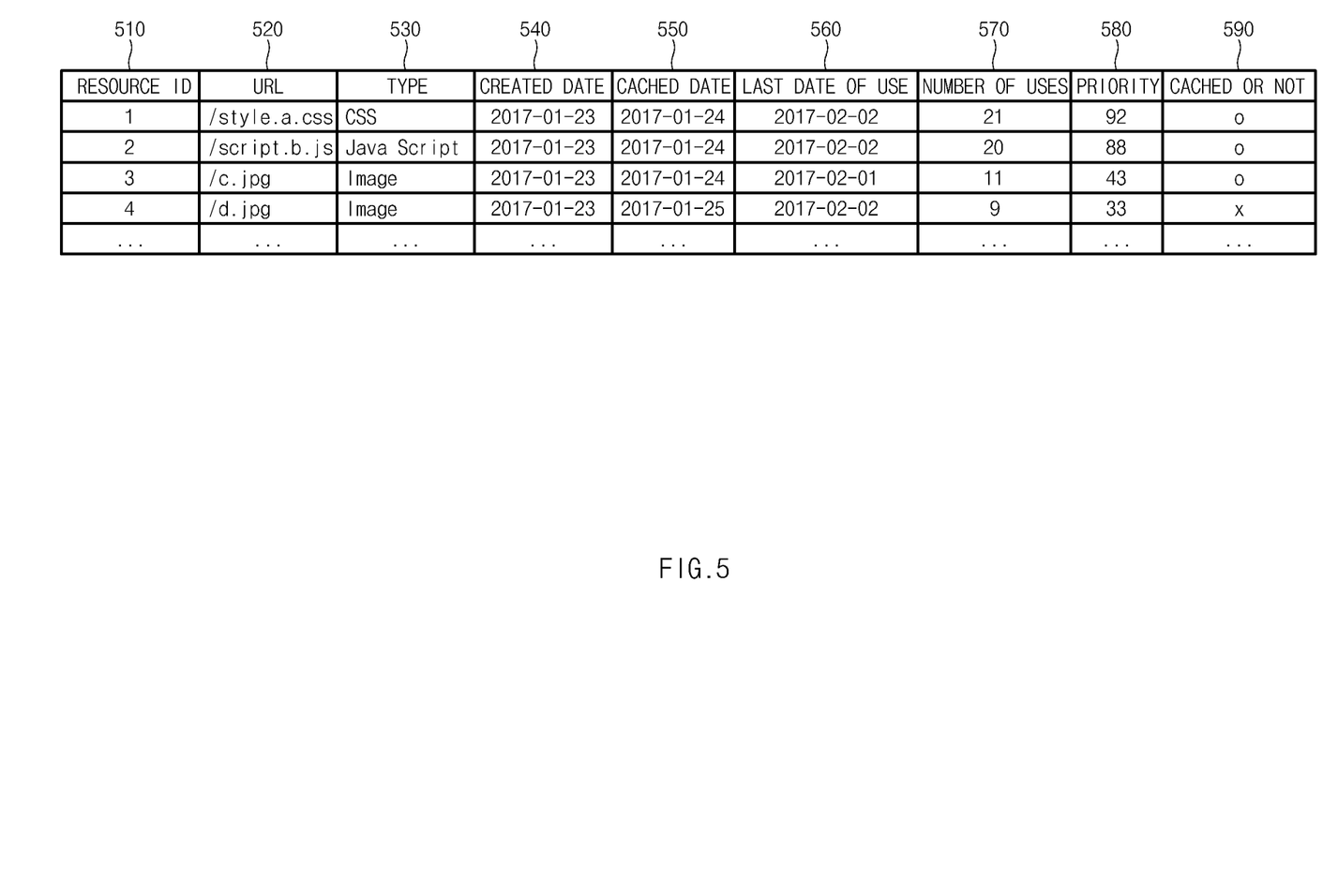
FIG. 5 is a drawing illustrating a resource list according to an embodiment.

FIG. 5 is a drawing illustrating a resource list according to an embodiment.

Referring to FIG. 5, a processor (e.g., a processor 150 of FIG. 1) of an electronic device (e.g., an electronic device 100 of FIG. 1) may manage a resource included in a native web application (e.g., a native web application 111 of FIG. 1) or a resource cached in a first memory (e.g., a first memory 110 of FIG. 1) through the resource list. For example, the processor may record an identifier (ID) 510 of the resource, a URL 520 of the resource, a type (or format) 530 of the resource, a created date 540 of the resource, a cached date 550 of the resource, a last date of use 560 of the resource, the number of uses 570 of the resource, a priority 580 of the resource, whether the cache is cached 590, or the like in the resource list.

The ID 510 of the resource may include information for identifying the resource. According to an embodiment, the processor may assign the ID 510 of the resource in an order where information of the resource is recorded in the resource list. The URL 520 of the resource may include information indicating a location where the resource is stored. The type 530 of the resource may include, for example, information indicating whether the resource is a file (e.g., css) defining a style (e.g., layout) of a web page, whether the resource is a file (e.g., jayscript) defining a dynamic portion or the like in the web page, or whether the resource is an image or the like. The created date 40 of the resource may include date information when the resource is generated. The cached date 550 of the resource may include date information when the resource is stored in a cache area of the first memory. The last date of use 560 of the resource may include date information when the resource is used last. The number of uses 560 of the resource may include the number of times information that the resource is used. The priority 580 of the resource may be set on the basis of the number of uses 560 of the resource, the last date of use 560, or the like. According to an embodiment, a target deleted from the cache area of the first memory may be selected according to the priority 580 of the resource. Whether the resource is cached 590 may include information indicating whether the resource is stored in the cache area of the first memory.

Figure 6:
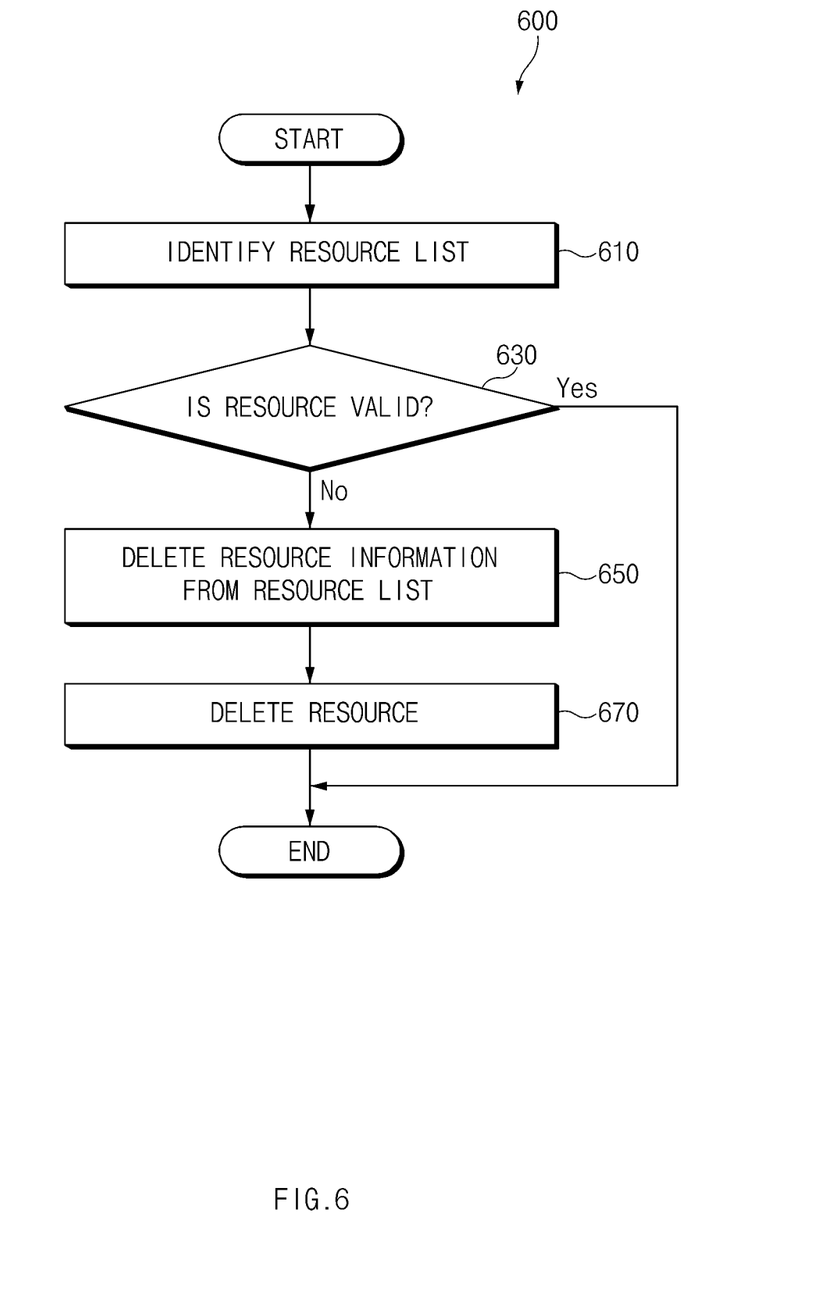
FIG. 6 is a drawing illustrating an operation method of an electronic device associated with deleting a resource according to an embodiment.

FIG. 6 is a drawing illustrating an operation method 600 of an electronic device associated with deleting a resource according to an embodiment.

Referring to FIG. 6, in conjunction with the operation method 600 of the electronic device associated with deleting the resource, a processor (e.g., a processor 150 of FIG. 1) of the electronic device (e.g., an electronic device 100 of FIG. 1) may delete a resource cached in a first memory (e.g., a first memory 110 of FIG. 1). The processor may delete the cached resource to ensure a space for a specified area (e.g., a cache area) of the first memory.

In operation 610, the processor may identify a resource list recording information about a resource included in a native web application (e.g., a native web application 111 of FIG. 1) or a resource cached in the first memory. Furthermore, the processor may select a target to be deleted, based on information about the resource recorded in the resource list. As an example, the processor may select a target to be deleted, in an order of resources with low priorities, in a priority (e.g., a priority 580 of the resource) set on the basis of the number of uses of the resource (e.g., the number of uses 570 of the resource), a last date of use of the resource (e.g., a last date of use 560 of the resource), or the like. As another example, when a resource which is not recorded in the resource list is stored in a cache area of the first memory, the processor may select the corresponding resource as a target to be deleted.

In operation 630, the processor may determine whether the resource is valid. As an example, the processor may identify whether the resource is selected as a target to be deleted.

When the resource is not valid (e.g., when the resource is the target to be deleted), in operation 650, the processor may delete information about the resource from the resource list. Furthermore, in operation 670, the processor may delete the resource from the cache area of the first memory.

According to an embodiment, the processor may repeat the operation of selecting a target to be deleted, deleting information about the resource selected as the target to be deleted, and deleting the resource selected as the target to be deleted, until a space for the cache area of the first memory meets a specified level (or size).

As described above, according to various embodiments, a method for caching a resource in an electronic device (e.g., the electronic device 100) may include transmitting, by a processor of the electronic device, a request to identify whether a first resource included in a native web application stored in a first memory is changed to an external electronic device, via a communication circuitry, when a specified condition is met, using the first resource in response to receiving a response that the first resource is not changed from the external electronic device or that the external electronic device does not respond to a connection, and receiving a second resource replacing the first resource from the external electronic device, via the communication circuitry, in response to receiving a response that the first resource is changed from the external electronic device and using the second resource.

According to various embodiments, the specified condition may include at least one of a condition where a time of access to the external electronic device is greater than a specified time and a condition where the number of times of accessing the external electronic device is greater than a specified number of times.

According to various embodiments, the method may further include storing information about the first resource or the second resource in the first memory.

According to various embodiments, the information may include at least one of an identifier of the first resource or the second resource, a URL of the first resource or the second resource, a type of the first resource or the second resource, a created date of the first resource or the second resource, a cached date of the first resource or the second resource, a last date of use of the first resource or the second resource, the number of uses of the first resource or the second resource, a priority of the first resource or the second resource, or whether the first resource or the second resource is cached.

According to various embodiments, the method may further include identifying an expiration date of the first resource or the second resource stored in the first memory, downloading the second resource from the external electronic device, via the communication circuitry, when it is determined that the expiration date elapses, and storing the downloaded second resource in the first memory.

According to various embodiments, the method may further include, when a space of the first memory is less than or equal to a specified level (or size), determining whether to delete the first resource or the second resource based on a priority of the first resource or the second resource stored in the first memory and, when the first resource or the second resource is a target to be deleted, deleting the first resource or the second resource from the first memory.

According to various embodiments, the method may further include assigning the priority based on at least one of the number of uses of the first resource or the second resource and a last date of use of the first resource or the second resource.

According to various embodiments, transmitting a request to identify whether the first resource is changed to the external electronic device through a thread, storing the first resource in the first memory, and receiving the second resource and storing the second resource in the first memory may be performed.

Figure 7:
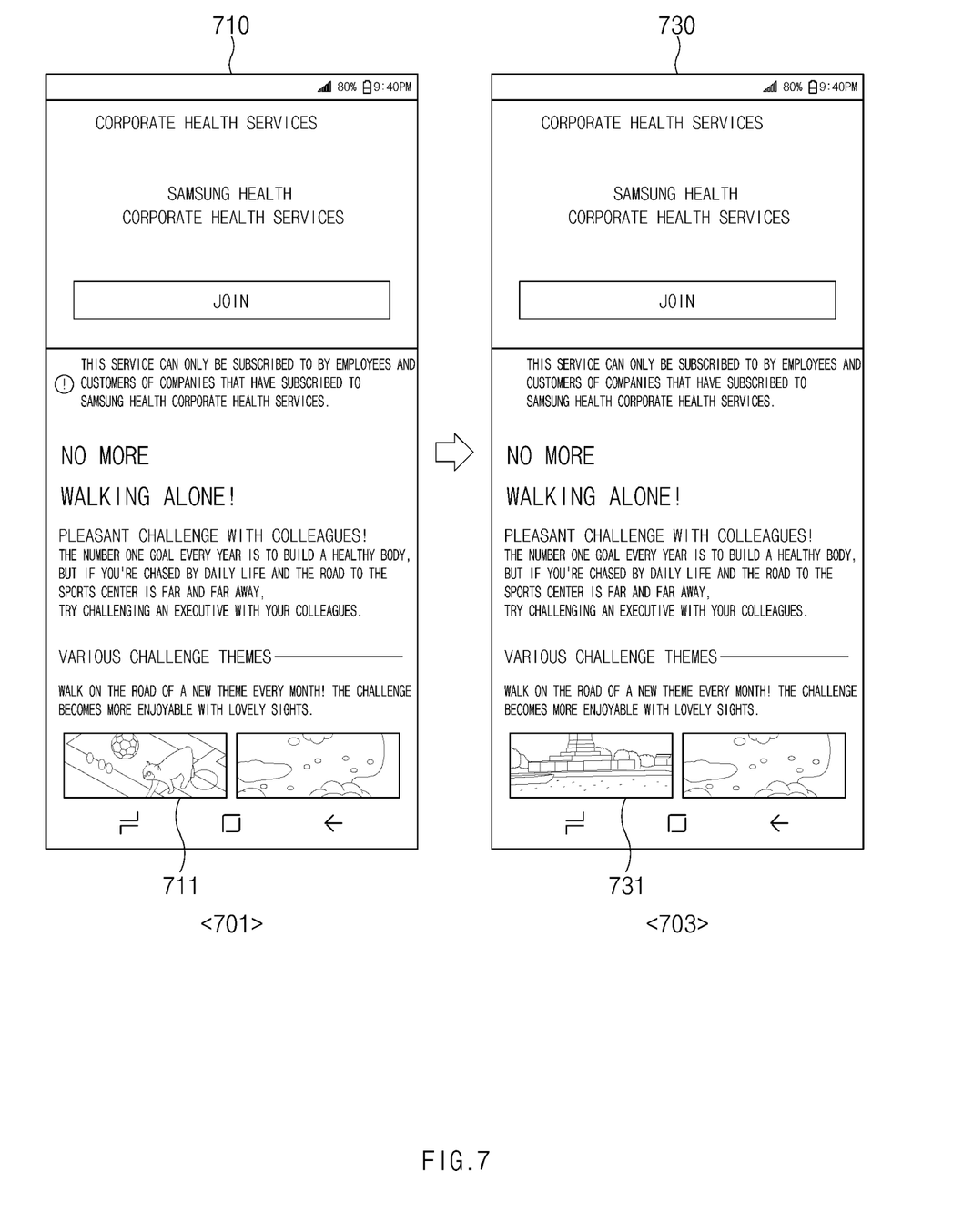
FIG. 7 is a drawing illustrating a screen describing use of a resource according to an embodiment.

FIG. 7 is a drawing illustrating a screen describing use of a resource according to an embodiment.

Referring to FIG. 7, a processor (e.g., a processor 150) of an electronic device (e.g., an electronic device 100) may provide a web function of a native web application (e.g., a native web application 111) using a first resource 711 cached in a first memory (e.g., a first memory 110). For example, in state 701, the processor may output a first web page screen 710 of the native web application on a display (e.g., a display 170).

According to an embodiment, the processor may update the cached first resource 711 by means of a web server. Because the process of updating the first resource 711 is performed independently of processing an instruction to use a resource associated with a web page (as the background), the previously cached first resource 711 may be used to configure the first web page screen 710. This may lead to an effect of preventing screen blinking due to a change in resource from being generated, because a second resource 731 to which the first resource is changed in real time is not reflected in the first web page screen 710. Furthermore, in state 703, a second web page screen 730 using the changed second resource 731 may be output when the native web application is run again.

Figure 8:
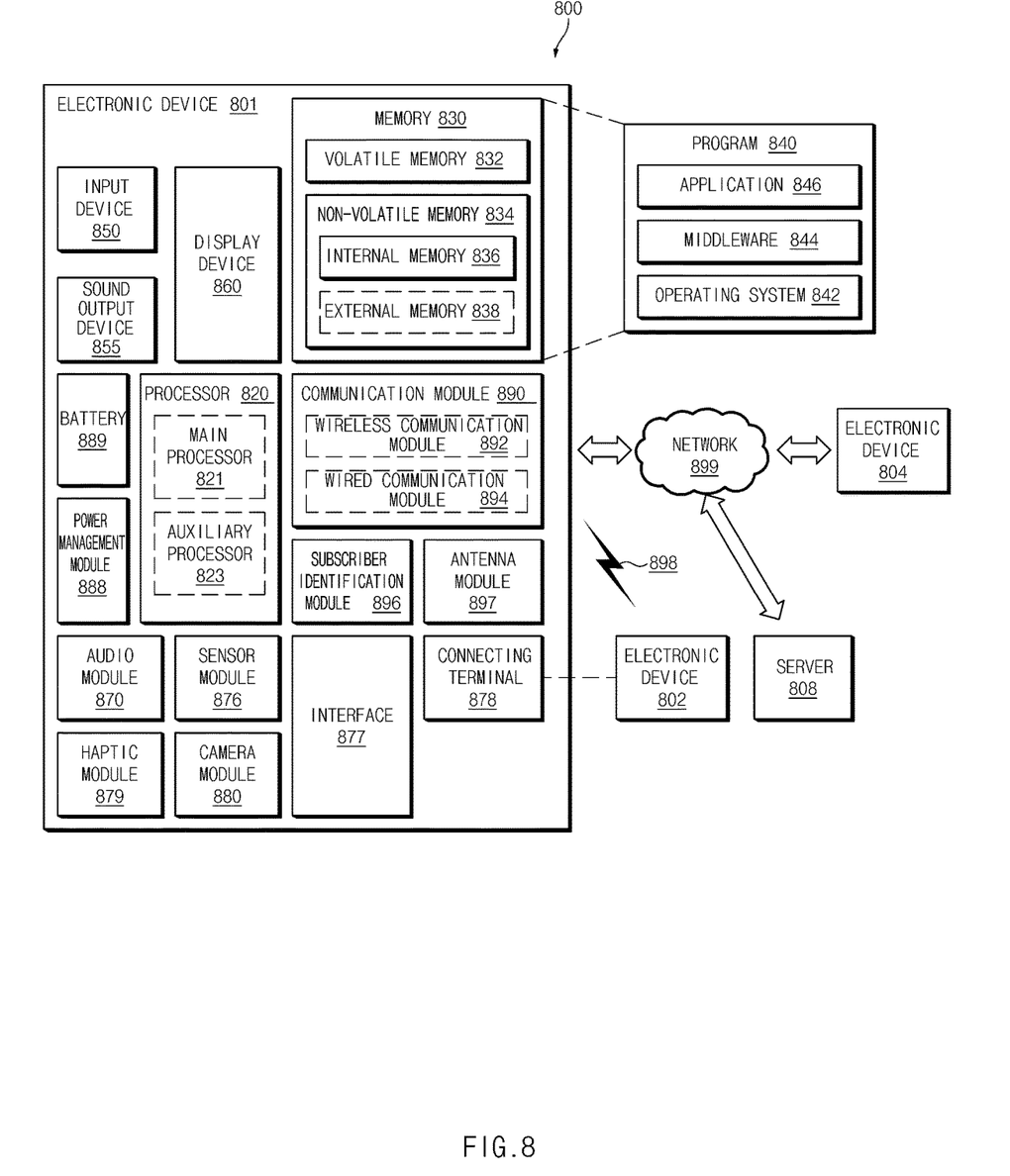
FIG. 8 is a block diagram illustrating an electronic device in a network environment according to various embodiments.

FIG. 8 is a block diagram of an electronic device 801 in a network environment 800 according to various embodiments.

Referring to FIG. 8, the electronic device 801 (e.g., the electronic device 100 of FIG. 1) may communicate with an electronic device 802 through a first network 898 (e.g., a short-range wireless communication) or may communicate with an electronic device 804 or a server 808 through a second network 899 (e.g., a long-distance wireless communication) in the network environment 800. According to an embodiment, the electronic device 801 may communicate with the electronic device 804 through the server 808. According to an embodiment, the electronic device 801 may include a processor 820 (e.g., the processor 150 of FIG. 1), a memory 830 (e.g., the first memory 110 and the second memory 130 of FIG. 1), an input device 850, a sound output device 855, a display device 860 (e.g., the display 170 of FIG. 1), an audio module 870, a sensor module 876, an interface 877, a haptic module 879, a camera module 880, a power management module 888, a battery 889, a communication module 890 (e.g., the communication circuit 190 of FIG. 1), a subscriber identification module 896, and an antenna module 897. According to some embodiments, at least one (e.g., the display device 860 or the camera module 880) among components of the electronic device 801 may be omitted or other components may be added to the electronic device 801. According to some embodiments, some components may be integrated and implemented as in the case of the sensor module 876 (e.g., a fingerprint sensor, an iris sensor, or an illuminance sensor) embedded in the display device 860 (e.g., a display).

The processor 820 may operate, for example, software (e.g., a program 840) to control at least one of other components (e.g., a hardware or software component) of the electronic device 801 connected to the processor 820 and may process and compute a variety of data. The processor 820 may load a command set or data, which is received from other components (e.g., the sensor module 876 or the communication module 890), into a volatile memory 832, may process the loaded command or data, and may store result data into a nonvolatile memory 834. According to an embodiment, the processor 820 may include a main processor 821 (e.g., a central processing unit or an application processor) and an auxiliary processor 823 (e.g., a graphic processing device, an image signal processor, a sensor hub processor, or a communication processor), which operates independently from the main processor 821, additionally or alternatively uses less power than the main processor 821, or is specified to a designated function. In this case, the auxiliary processor 823 may operate separately from the main processor 821 or embedded.

In this case, the auxiliary processor 823 may control, for example, at least some of functions or states associated with at least one component (e.g., the display device 860, the sensor module 876, or the communication module 890) among the components of the electronic device 801 instead of the main processor 821 while the main processor 821 is in an inactive (e.g., sleep) state or together with the main processor 821 while the main processor 821 is in an active (e.g., an application execution) state. According to an embodiment, the auxiliary processor 823 (e.g., the image signal processor or the communication processor) may be implemented as a part of another component (e.g., the camera module 880 or the communication module 890) that is functionally related to the auxiliary processor 823.

The memory 830 may store a variety of data used by at least one component (e.g., the processor 820 or the sensor module 876) of the electronic device 801, for example, software (e.g., the program 840) and input data or output data with respect to commands associated with the software. The memory 830 may include the volatile memory 832 or the nonvolatile memory 834.

The program 840 may be stored in the memory 830 as software and may include, for example, an operating system 842, a middleware 844, or an application 846.

The input device 850 may be a device for receiving a command or data, which is used for a component (e.g., the processor 820) of the electronic device 801, from an outside (e.g., a user) of the electronic device 801 and may include, for example, a microphone, a mouse, or a keyboard.

The sound output device 855 may be a device for outputting a sound signal to the outside of the electronic device 801 and may include, for example, a speaker used for general purposes, such as multimedia play or recordings play, and a receiver used only for receiving calls. According to an embodiment, the receiver and the speaker may be either integrally or separately implemented.

The display device 860 may be a device for visually presenting information to the user and may include, for example, a display, a hologram device, or a projector and a control circuit for controlling a corresponding device. According to an embodiment, the display device 860 may include a touch circuitry or a pressure sensor for measuring an intensity of pressure on the touch.

The audio module 870 may convert a sound and an electrical signal in dual directions. According to an embodiment, the audio module 870 may obtain the sound through the input device 850 or may output the sound through an external electronic device (e.g., the electronic device 802 (e.g., a speaker or a headphone)) wired or wirelessly connected to the sound output device 855 or the electronic device 801.

The sensor module 876 may generate an electrical signal or a data value corresponding to an operating state (e.g., power or temperature) inside or an environmental state outside the electronic device 801. The sensor module 876 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support a designated protocol wired or wirelessly connected to the external electronic device (e.g., the electronic device 802). According to an embodiment, the interface 877 may include, for example, an HDMI (high-definition multimedia interface), a USB (universal serial bus) interface, an SD card interface, or an audio interface.

A connecting terminal 878 may include a connector that physically connects the electronic device 801 to the external electronic device (e.g., the electronic device 802), for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. The haptic module 879 may include, for example, a motor, a piezoelectric element, or an electric stimulator.

The camera module 880 may shoot a still image or a video image. According to an embodiment, the camera module 880 may include, for example, at least one lens, an image sensor, an image signal processor, or a flash.

The power management module 888 may be a module for managing power supplied to the electronic device 801 and may serve as at least a part of a power management integrated circuit (PMIC).

The battery 889 may be a device for supplying power to at least one component of the electronic device 801 and may include, for example, a non-rechargeable (primary) battery, a rechargeable (secondary) battery, or a fuel cell.

The communication module 890 may establish a wired or wireless communication channel between the electronic device 801 and the external electronic device (e.g., the electronic device 802, the electronic device 804, or the server 808) and support communication execution through the established communication channel. The communication module 890 may include at least one communication processor operating independently from the processor 820 (e.g., the application processor) and supporting the wired communication or the wireless communication. According to an embodiment, the communication module 890 may include a wireless communication module 892 (e.g., a cellular communication module, a short-range wireless communication module, or a GNSS (global navigation satellite system) communication module) or a wired communication module 894 (e.g., an LAN (local area network) communication module or a power line communication module) and may communicate with the external electronic device using a corresponding communication module among them through the first network 898 (e.g., the short-range communication network such as a Bluetooth, a WiFi direct, or an IrDA (infrared data association)) or the second network 899 (e.g., the long-distance wireless communication network such as a cellular network, an internet, or a computer network (e.g., LAN or WAN)). The above-mentioned various communication modules 890 may be implemented into one chip or into separate chips, respectively.

According to an embodiment, the wireless communication module 892 may identify and authenticate the electronic device 801 using user information stored in the subscriber identification module 896 in the communication network.

The antenna module 897 may include one or more antennas to transmit or receive the signal or power to or from an external source. According to an embodiment, the communication module 890 (e.g., the wireless communication module 892) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 801 and the external electronic device 804 through the server 808 connected to the second network 899. Each of the electronic devices 802 and 804 may be the same or different types as or from the electronic device 801. According to an embodiment, all or some of the operations performed by the electronic device 801 may be performed by another electronic device or a plurality of external electronic devices. When the electronic device 801 performs some functions or services automatically or by request, the electronic device 801 may request the external electronic device to perform at least some of the functions related to the functions or services, in addition to or instead of performing the functions or services by itself. The external electronic device receiving the request may carry out the requested function or the additional function and transmit the result to the electronic device 801. The electronic device 801 may provide the requested functions or services based on the received result as is or after additionally processing the received result. To this end, for example, a cloud computing, distributed computing, or client-server computing technology may be used.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 840) including an instruction stored in a machine-readable storage media (e.g., an internal memory 836 or an external memory 838) readable by a machine (e.g., a computer). The machine may be a device that calls the instruction from the machine-readable storage media and operates depending on the called instruction and may include the electronic device (e.g., the electronic device 801). When the instruction is executed by the processor (e.g., the processor 820), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

The invention claimed is:

1. An electronic device, comprising:
a display;
a communication circuitry;
a first memory storing a native web application including a first resource;
a second memory loaded with instructions included in the native web application; and
a processor operatively connected with the display, the communication circuitry, the first memory, and the second memory,
wherein the processor is configured to:
while a connection between the electronic device and an external electronic device is not performed, generate a webpage related to the native web application using the first resource pre-stored in the first memory;
when the connection is performed, transmit a request to identify whether the first resource is changed to the external electronic device, via the communication circuitry;
use the first resource in response to receiving a response that the first resource is not changed from the external electronic device; and
receive a second resource replacing the first resource from the external electronic device, via the communication circuitry, in response to receiving a response that the first resource is changed from the external electronic device, and generate a webpage related to the native web application use the second resource.

2. The electronic device of claim 1, wherein the first memory includes a non-volatile memory, and
wherein the second memory includes a volatile memory.

3. The electronic device of claim 1, wherein the processor is configured to:
store information about the first resource or the second resource in the first memory.

4. The electronic device of claim 3, wherein the information includes at least one of an identifier of the first resource or the second resource, a URL of the first resource or the second resource, a type of the first resource or the second resource, a created date of the first resource or the second resource, a cached date of the first resource or the second resource, a last date of use of the first resource or the second resource, the number of uses of the first resource or the second resource, a priority of the first resource or the second resource, or whether the first resource or the second resource is cached.

5. The electronic device of claim 1, wherein the processor is configured to:
identify an expiration date of the first resource or the second resource;
download the second resource from the external electronic device, via the communication circuitry, when it is determined that the expiration date elapses; and
store the downloaded second resource in the first memory.

6. The electronic device of claim 1, wherein the processor is configured to:
when a space of the first memory is less than or equal to a specified level, determine whether to delete the first resource or the second resource based on a priority of the first resource or the second resource stored in the first memory; and
when the first resource or the second resource is a target to be deleted, delete the first resource or the second resource from the first memory.

7. The electronic device of claim 6, wherein the processor is configured to:
assign the priority based on at least one of the number of uses of the first resource or the second resource and a last date of use of the first resource or the second resource.

8. The electronic device of claim 1, wherein the processor is configured to:
transmit a request to identify whether the first resource is changed to the external electronic device, through a thread;
store the first resource in the first memory; and
receive the second resource and store the second resource in the first memory.

9. A method for caching a resource in an electronic device, the method comprising:
while a connection between the electronic device and an external electronic device is not performed, generating, by a processor of the electronic device, a webpage related to a native web application using a first resource pre-stored in a first memory of the electronic device,
when the connection is performed, transmitting, by the processor of the electronic device, a request to identify whether the first resource is changed to an external electronic device, via a communication circuitry;
using the first resource in response to receiving a response that the first resource is not changed from the external electronic device; and
receiving a second resource replacing the first resource from the external electronic device, via the communication circuitry, in response to receiving a response that the first resource is changed from the external electronic device, and generating a webpage related to the native web application using the second resource.

10. The method of claim 9, further comprising:
storing information about the first resource or the second resource in the first memory,
wherein the information includes at least one of an identifier of the first resource or the second resource, a URL of the first resource or the second resource, a type of the first resource or the second resource, a created date of the first resource or the second resource, a cached date of the first resource or the second resource, a last date of use of the first resource or the second resource, the number of uses of the first resource or the second resource, a priority of the first resource or the second resource, or whether the first resource or the second resource is cached.

11. The method of claim 9, further comprising:

identifying an expiration date of the first resource or the second resource;

downloading the second resource from the external electronic device, via the communication circuitry, when it is determined that the expiration date elapses; and storing the downloaded second resource in the first memory.

12. The method of claim 9, further comprising:

when a space of the first memory is less than or equal to a specified level, determining whether to delete the first resource or the second resource based on a priority of the first resource or the second resource stored in the first memory; and when the first resource or the second resource is a target to be deleted, deleting the first resource or the second resource from the first memory.

13. The method of claim 12, further comprising:

assigning the priority based on at least one of the number of uses of the first resource or the second resource and a last date of use of the first resource or the second resource.

* * * * *